United States Patent
Heap et al.

(10) Patent No.: US 9,895,628 B2
(45) Date of Patent: *Feb. 20, 2018

(54) COVER WITH GAS PERMEABLE LAYER

(71) Applicant: Colorado Lining International, Inc., Parker, CO (US)

(72) Inventors: John Heap, Highlands Ranch, CO (US); Andre Alan Harvey, Spring Valley, CA (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,120

(22) Filed: May 2, 2016

(65) Prior Publication Data

US 2016/0243465 A1    Aug. 25, 2016

Related U.S. Application Data

(63) Continuation of application No. 14/320,927, filed on Jul. 1, 2014, now Pat. No. 9,352,249.

(60) Provisional application No. 61/847,801, filed on Jul. 1, 2013.

(51) Int. Cl.
*B01D 19/00* (2006.01)

(52) U.S. Cl.
CPC ..... *B01D 19/0031* (2013.01); *Y10T 29/49826* (2015.01)

(58) Field of Classification Search
CPC .............. B01D 19/0031; B01D 53/228; Y10T 29/49826; B65D 51/16
See application file for complete search history.

(56) References Cited

U.S. PATENT DOCUMENTS

| | | | |
|---|---|---|---|
| 3,980,199 A | 9/1976 | Kays et al. | |
| 4,189,058 A | 2/1980 | Seliskar et al. | |
| 4,197,595 A | 4/1980 | Dearing | |
| 4,438,863 A * | 3/1984 | Wilson | B65D 88/34 220/219 |
| 5,730,306 A * | 3/1998 | Costa | B65D 51/1616 215/261 |
| 9,352,249 B2 * | 5/2016 | Heap | B01D 19/0031 |

FOREIGN PATENT DOCUMENTS

WO    199816479 A1    4/1994

* cited by examiner

*Primary Examiner* — Jason M Greene
(74) *Attorney, Agent, or Firm* — Holzer Patel Drennan

(57) ABSTRACT

A holding tank cover includes a gas permeable insulating membrane and a gas impermeable cover layer sized to overlay and conceal the gas permeable membrane. Together, the gas permeable membrane and the gas impermeable cover layer facilitate a controlled transmission of gas between an interior of the holding tank and an environment external to the holding tank.

19 Claims, 8 Drawing Sheets

COVER WITH GAS PERMEABLE LAYER

CROSS-REFERENCE TO RELATED APPLICATIONS

The present application claims benefit of priority to U.S. patent application Ser. No. 14/320,927, issued as U.S. Pat. No. 9,352,249, entitled "Cover with Gas Permeable Layer" and filed on Jul. 1, 2014, which further claims priority to U.S. Provisional Patent Application No. 61/841,801 entitled "Cover with Gas Permeable Layer" and filed on Jul. 1, 2013. Both of these applications are specifically incorporated by reference for all that they disclose or teach.

BACKGROUND

Flexible covers can be used in combination with a variety of storage vessels, tanks, containment structures, or reservoirs that store quantities of petroleum, waste, water, etc. In some applications, such as biogas production systems, gas produced within a vessel is vented from the vessel. However, existing flexible covers can sometimes flex, dip, or bend above or below the liquid surface, trapping the gas and preventing the transmission of the gas from the vessel interior to one or more extraction openings. For example, the flow of gas out of the vessel may be inhibited if the edges of the cover are drawn, such as under negative pressure, to a position at or below a surface level of a liquid volume within the vessel. In such cases, system damage and/or system failure may result. In addition, flexible covers designed to provide insulation can be expensive and difficult to construct.

SUMMARY

Implementations described herein may be utilized to address the forgoing by providing a cover for a gas scavenging system that includes a gas permeable membrane adjacent to a gas impermeable cover layer. The gas permeable membrane includes a number of voids that collectively create a number of passages through which gasses can flow. In operation, a downward-facing surface of the gas permeable membrane is placed into contact with liquid in a reservoir. Gas produced within the reservoir can travel radially through the membrane and exit the reservoir through one or more gas extraction openings. The gas permeable membrane can be a buoyant material that substantially floats above the contained liquid or is otherwise suspended above the liquid level.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTIONS OF THE DRAWINGS

DETAILED DESCRIPTIONS

Figure 1:
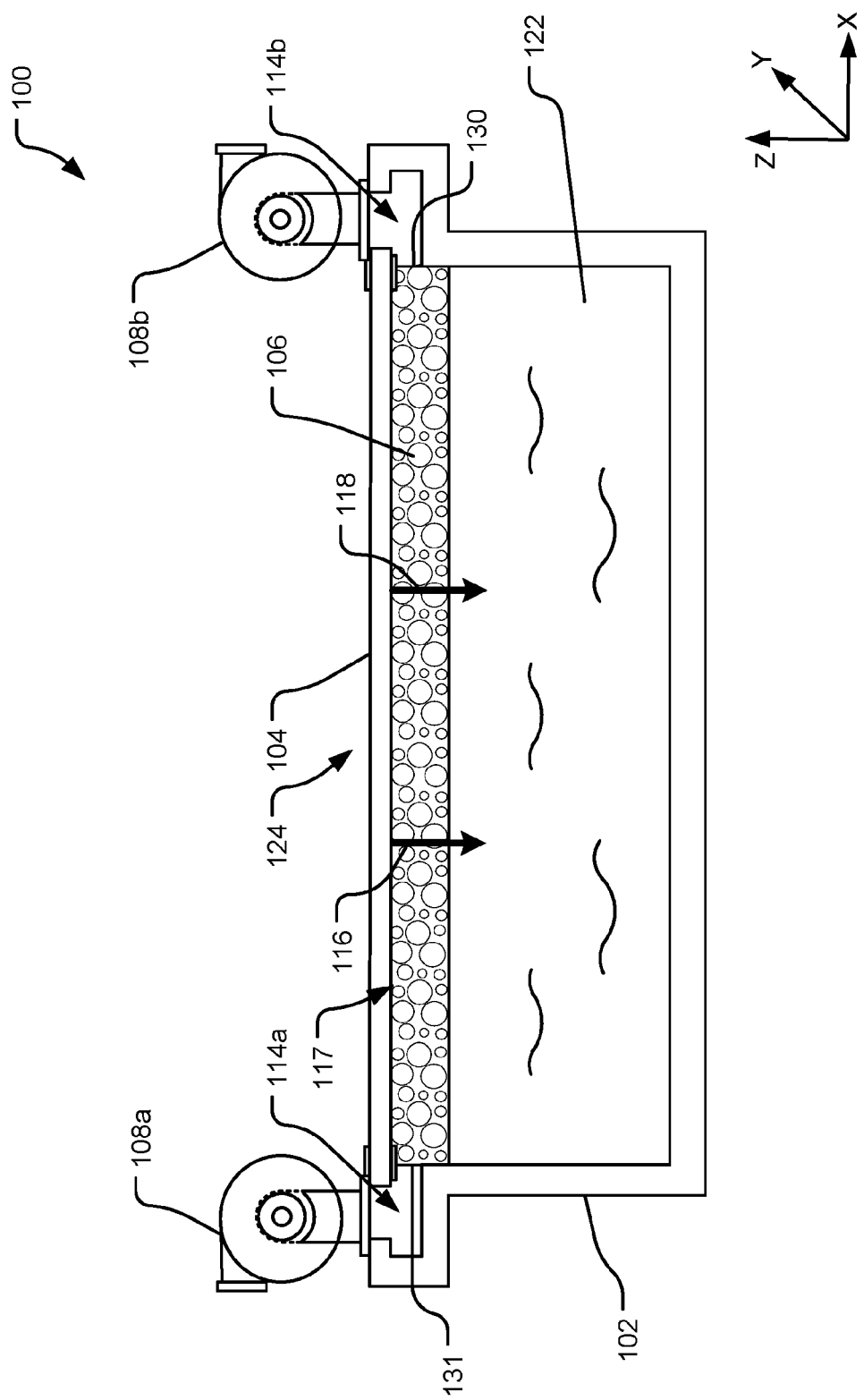
FIG. 1 illustrates a cross-sectional view of an example gas scavenging system with a cover.

FIG. 1 illustrates a cross-sectional view of an example gas scavenging system 100 with a cover 124. When under a negative pressure (e.g., a negative pressure illustrated by arrows 116 and 118), some covers have a tendency to flex and/or dip below a surface level of liquid, forming isolated "pockets" of gas and inhibiting the lateral flow of gases within a holding tank 102. The cover 124 is designed to facilitate a controlled transmission of gases between the interior of a holding tank 102 and an environment external to the holding tank 102.

The cover 124 includes a gas impermeable cover layer 104 overlying and adjacent to a gas permeable membrane 106. The gas impermeable cover layer 104 is sized to substantially overlay and conceal the underlying gas permeable membrane 106. In operation, gasses within the holding tank 102 vent through the gas permeable membrane 106 and are released or captured into an external containment structure (not shown) through one or more gas extraction openings (e.g., gas extraction openings 114a and 114b). As used herein, "holding tank" may refer to a variety of containment structures of a variety of shapes and sizes including without limitation reservoirs that are either natural or man-made, storage tanks that are either in-ground or above ground, and tanks that are both open and closed to external environments.

Gas enters the gas permeable membrane 106 through one or more pores on an outer surface within the holding tank 102. The pores are in fluid communication with dedicated channels (e.g., a matrix of pores) within the gas permeable membrane 106. The dedicated channels provided for at least one pathway along which gas can flow to an extraction opening (e.g., extraction openings 112 and 114) formed in or adjacent to the cover 124. In operation, the gas permeable membrane 106 provides for transmission of gas within the holding tank through the membrane in one or more directions, such as in a radial direction parallel to the surface of the fluid volume 122.

The gas impermeable cover layer 104 forms an outer portion of the cover 124, and is positioned adjacent to the gas permeable membrane 106 opposite the interior of the holding tank 102. In operation, the gas impermeable cover layer 104 functions to reflect gas at downward angles toward the internal volume of the holding tank, facilitating outward radial transport of the gas through the gas permeable membrane 106 and toward the gas extraction openings 114a and 114b. Radial transport of the gas may occur within the gas permeable membrane 106 and/or through a spacing between the gas permeable membrane 106 and the gas impermeable cover layer 104.

In FIG. 1, the gas exits the gas permeable membrane 106 though side surfaces 130 and 131, which are each shown directly adjacent a gas intake port of one of the extraction openings 114a and 114b. In other implementations, the gas permeable membrane 106 does not extend all the way to the wall of the holding tank 102 as shown. Rather, there is a gap between a sidewall of the holding tank 102 and the side surfaces 130 and 131 through which gas vents and flows to one of the extraction opening 114a or 114b.

In operation, the extraction openings 114a and 114b allow for a controlled release and/or capture of the gas to an environment external to the vessel 102. For example, the gas may be scavenged from the holding tank 102 either naturally (e.g., venting) or using one or more extraction mechanisms 108a and 108b, such as a compressor, blower, or other scavenging tool. The scavenged gas can be released into the atmosphere, captured by another containment vessel, and/or vented to a flare stack.

The gas extraction openings 114a and 114b are shown as openings (e.g., gaps or apertures through which gas can flow freely) between a sidewall of the holding tank 102 and an edge of the gas impermeable cover layer 104. Other implementations direct gas out of the holding tank 102 though one or more apertures or cutouts within the gas impermeable cover layer 104. The number of gas extraction openings included in each implementation may vary from one system to another.

In some implementations, the gas permeable membrane 106 is connected (e.g., stitched, sealed, or otherwise attached to) the gas impermeable cover layer 104. For example, the gas permeable membrane 106 and the gas impermeable cover layer 104 may be free-floating and interconnected buoyant structures permitted to rise and fall along with the surface level of the fluid volume 122 in the holding tank 102. In another implementation, the gas impermeable cover layer 104 and the gas permeable membrane 106 are connected but not free-floating. For example, the cover 124 may be secured at a stationary height and/or lateral orientation relative to the holding tank 102.

In other implementations, the gas permeable membrane 106 and the gas impermeable cover layer 104 are separate elements. For example, the gas permeable membrane 106 may be free-floating within the holding tank 102 while the gas impermeable cover layer 104 is secured to the holding tank 102, such as secured to the edges of the holding tank 102 and/or suspended at a distance above the surface level of the fluid volume 122. In still another implementation, the gas permeable membrane 106 and the gas impermeable cover layer 104 are both free-floating atop the fluid volume 122 (e.g., water, bio-waste, etc.), but not attached to one another.

The gas permeable membrane 106 can be constructed of a variety of suitable materials, including, without limitation, closed-cell polyethylene foam (e.g., recycled closed-cell polyethylene foam), such as a foam including a geotextile fabric applied to one side to facilitate field joining segments together. Other foam types may include open cell high density polyethylene foam; a polystyrene, Styrofoam, or rubber material, etc. Material of the gas permeable membrane 106 may be resistant to penetration by liquids, and may have a density that is less than the density of a type of liquid to be stored in the holding tank 102 to provide buoyancy. The method of manufacturing the gas permeable membrane 106 may ensure that a matrix is created having voids or channels that allow gasses to pass through it. In one implementation, open or closed cell foam fragments or shapes are heat bonded together in such a manner that pluralities of adjoining voids are left between constituent shapes or fragments bonded together. Alternately, the permeable membrane layer may consist entirely of an open-cell foam like material.

In one example implementation, the gas permeable membrane 106 is about 1" thick and includes gas permeable voids that range in size from between approximately ⅛ of an inch to 1/32 of an inch. Although voids between spherical elements are shown in FIG. 1, the voids may be a variety of shapes including, without limitation, conical, rectangular, trapezoidal, or other non-traditional shape. The voids may have uniform shape and size, or a plurality of different shapes and/or sizes.

The gas impermeable cover layer 104 may be a flexible or rigid material made of one or more of a variety of materials. Example suitable materials include, without limitation, high-density polyethylene (HDPE) (e.g., non-reinforced HDPE), reinforced low-density polyethylene (RLDPE), reinforced EIA (Reinforced Elvaloy Interpolymer Alloy), Reinforced Polypropylene, or Chlorosulfonated Polyethylene (CSPE). In addition to being gas impermeable, the gas impermeable cover layer 104 may also be impermeable or resistant to penetration by liquids.

In some implementations, portions of the gas impermeable cover layer 104 are separated from the gas permeable membrane 106 by a distance or gap forming a channel through which gas may travel radially, such as a direction parallel to an upper-facing surface 117 of the gas permeable membrane 106. In other implementations, there is no gap between the gas impermeable cover layer 104 and the gas permeable membrane 106. For example, the gas impermeable cover layer 104 may be a gas impermeable coating, such as a layer of latex or plastic applied directly to the upper surface of the gas permeable membrane 106.

The thickness of the gas impermeable layer 104 may vary in different implementations depending on system parameters. In one example implementation, the thickness of the gas impermeable cover layer 104 ranges between approximately 45 mil (e.g., reinforced material) and 100 mil (e.g., non re-enforced material). Other implementations are also contemplated.

The cover 124 provides thermal insulation for the holding tank 102. Unlike other insulating covers that include multiple layers of material, seams, encapsulating pockets and/or other attachment mechanisms, the cover 124 includes few (e.g., 1-2) layers of material that are simply attached, such as by an adhesive or minor stitching, or not attached at all. As a result, the cover 124 can be produced at lower cost than conventional insulating covers.

The cover 124 is contemplated for use in a variety of different systems. In one implementation, liquid biomass is stored within the holding tank 102, and microbes are placed within the vessel 102 to convert the liquid biomass to gaseous waste (e.g., biogas). The gaseous waste is vented through the gas extraction openings 114a and 114b. In another implementation, the gas permeable membrane 106 is used as a gas conduction layer in reservoirs that are aerated and covered, such as landfill leachate applications where rainwater infiltration is undesirable.

Figure 2:
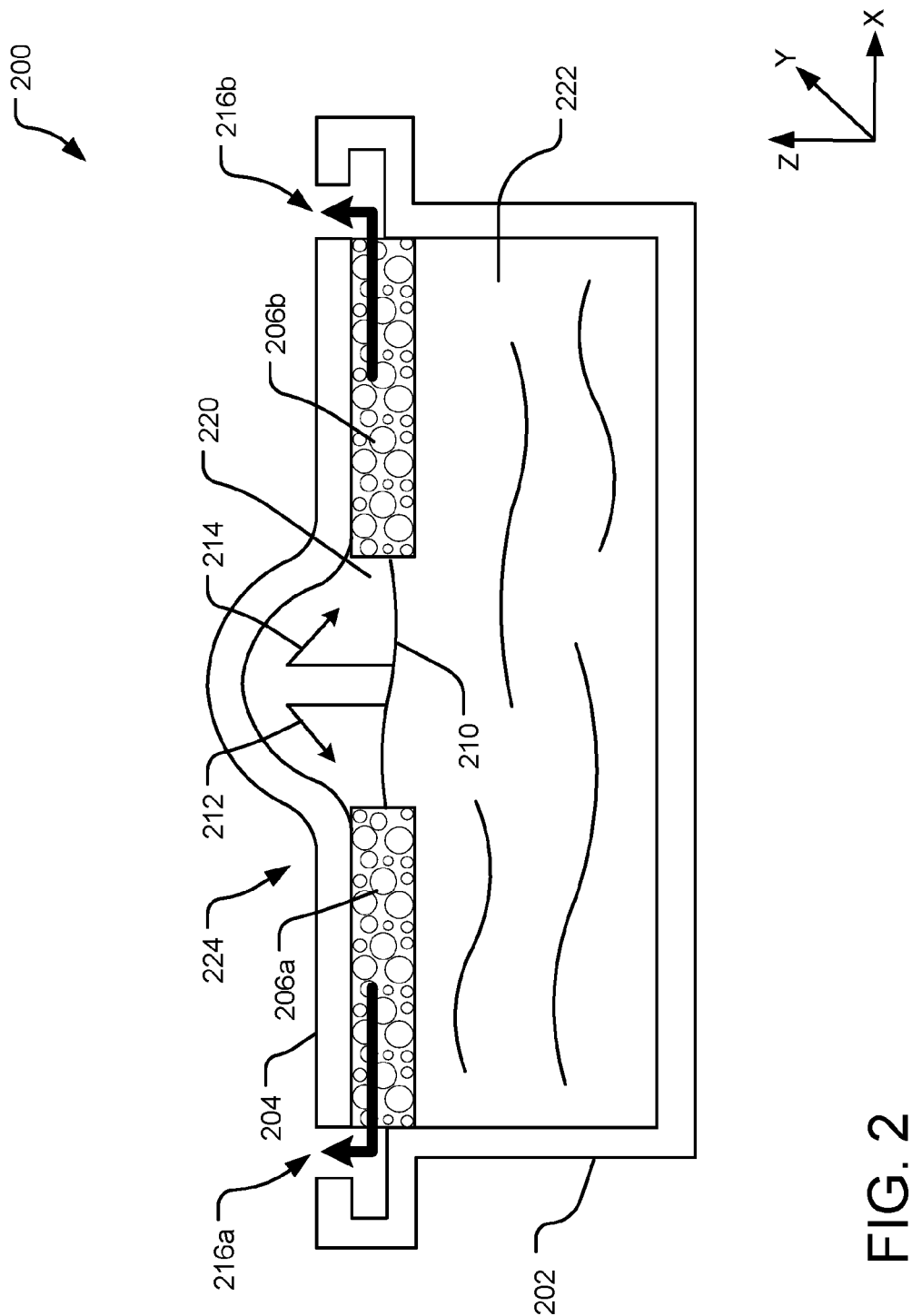
FIG. 2 illustrates a cross-sectional view of another example gas scavenging system with a cover.

FIG. 2 illustrates a cross-sectional view of another example gas scavenging system 200 with a cover 224. The cover 224 includes a gas impermeable cover layer 204 overlying and adjacent to a gas permeable membrane 206.

The gas permeable membrane 206 includes at least two separate sections (e.g., sections 206a and 206b) through which gases can flow in a generally lateral direction (e.g., substantially parallel to a surface of a fluid volume 222 within the holding tank 202).

The gas impermeable cover layer 204 overlies and interlinks the separate sections 206a and 206b of the gas permeable membrane 206 and reflects gas within the tank at a variety of downward angles (e.g., example angles illustrated by arrows 212 and 214) to facilitate lateral transport and eventual scavenging of gas through one or more extraction openings (e.g., gas extraction openings 216a and 216b). Each of the separate sections of the gas permeable membrane 206 includes channels (e.g., interconnected pores) that are in fluid communication with at least one of the extraction openings.

The separate sections 206a, 206b of the gas permeable membrane 206 are made of a material that is buoyant when placed atop of a volume of water or other liquid or gas. The gas permeable membrane 206 supplies an upward force to counteract negative (e.g., downward) pressure. As a result, gas within the tank can be scavenged from the system 200 despite changes in barometric pressure. Forming the gas permeable membrane 206 using separate sections (e.g., 206a and 206b, as shown) rather than one continuous unit (e.g., as shown in FIG. 1) may reduce manufacturing costs without significantly compromising functionality of the cover 224.

In one implementation, buoyancy and/or thickness of the gas permeable membrane 206 prevents the gas impermeable cover layer 204 from contacting a surface 210 of the fluid volume 222 within the holding tank 202. In another implementation the gas impermeable cover layer 204 is permitted to contact the surface 210 of the fluid volume in one or more places; however, such contact does not substantially impede gas transmission routes to the one or more extraction openings (e.g., the extraction opening 216a or 216b).

The different sections 206a and 206b of the gas permeable membrane 206 may be a variety of shapes and sizes including, for example, rectangular, triangular, elliptical, or other non-traditional shapes.

Figure 3:
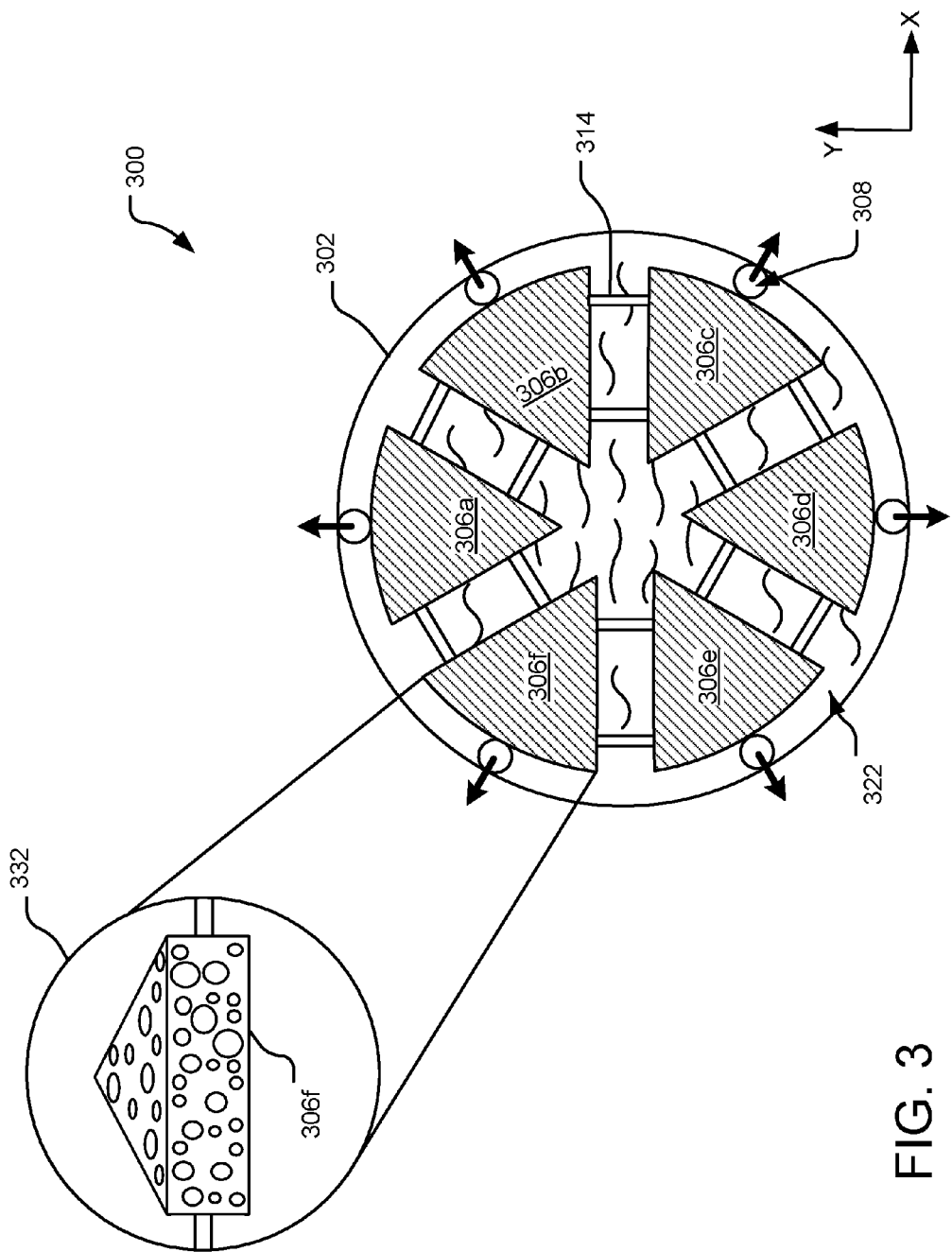
FIG. 3 illustrates a top and perspective view of another example gas scavenging system with a gas permeable membrane positioned atop a fluid volume within a holding tank.

FIG. 3 illustrates a top and perspective view of another example gas scavenging system 300 with a gas permeable membrane 306 positioned atop a fluid volume 322 within a holding tank 302. The gas permeable membrane 306 is a buoyant structure including a plurality of separate sections (e.g., sections 306a, 306b, 306c, 306d, 306e, and 306f) that each includes a number of exposed pores (as visible in exploded side perspective view 332). The exposed pores are in fluid communication with a plurality of internal channels and also with one or more channels between the separate sections of the gas permeable membrane 306. The channels between the different sections can enhance gas transmission to extraction openings (e.g., an extraction opening 308). The pores and internal channels of the gas permeable membrane 306 provide for transport of a gas in one or more directions through the gas permeable membrane 306 and to at least one associated extraction opening through which the gas can exit the holding tank 302.

In some implementations, the gas permeable membrane 306 is used in conjunction with a gas impermeable cover layer (not shown). The gas impermeable cover is adjacent to the gas permeable membrane opposite the interior of the holding tank 302, and may or may not attach to the gas permeable membrane 306.

The separate sections of the gas permeable membrane 306 are each interlinked to adjacent sections by one or more attachment mechanisms (e.g., an attachment mechanism 314). The attachment mechanisms may be, for example, ropes, bars, bungees, cords, cables, wires, etc. In one implementation, the separate sections are attached to one another by an overlaying layer of material attached to each of the separate sections. The overlaying layer of material may be, for example, a gas impermeable cover layer (e.g., as shown and described with respect to FIGS. 1 and 2).

Figure 4:
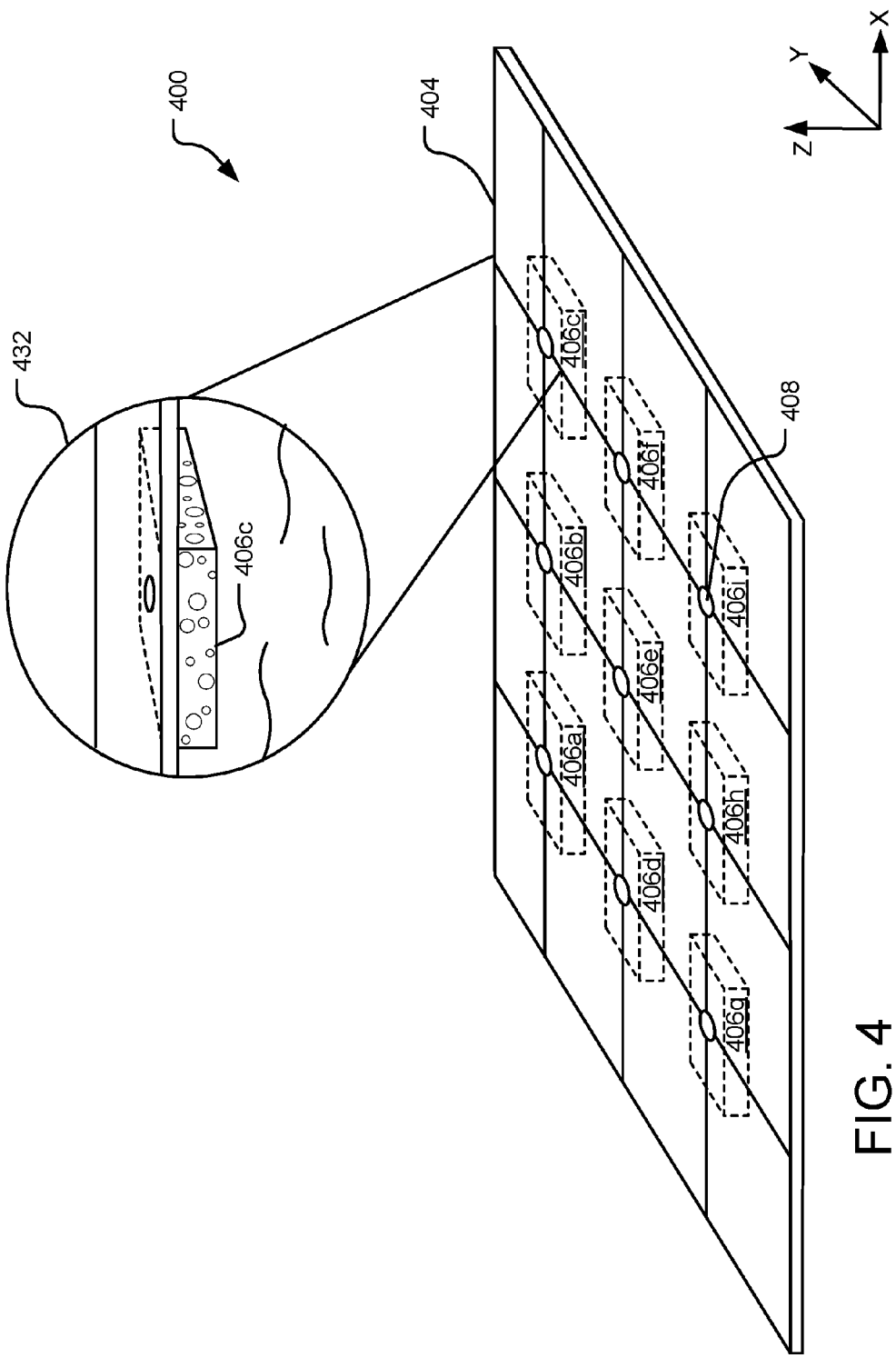
FIG. 4 illustrates a cross-sectional view of another example gas scavenging system including a gas impermeable cover layer and an underlying gas permeable membrane.

FIG. 4 illustrates a cross-sectional view of another example gas scavenging system 400 including a gas impermeable cover layer 404 and an underlying gas permeable membrane 406. The gas permeable membrane 406 is a buoyant structure including a plurality of separate rectangular sections (e.g., sections 406b, 406c, 406d, 406e, 406f, 406g, 406h, and 406i) that each includes a number of exposed pores (as visible in exploded side perspective view 432). The exposed pores are in fluid communication with plurality of internal channels. The pores and internal channels of the gas permeable membrane 406 provide for transport of a gas in one or more directions through the gas permeable membrane 406.

The gas impermeable cover layer 404 overlies the sections of gas permeable membrane 406, and functions to reflect gas at downward (e.g., negative z-direction) angles toward an internal volume of a holding tank, facilitating radial transport (e.g., in the X-Y plane) of gas through each of the sections of the gas permeable membrane 406. A number of gas extraction openings, such as the opening 408, are included in the gas impermeable cover layer 404 and axially aligned (e.g., along a z-axis) with one of the underlying sections of the gas permeable membrane 406. These openings each provide an outlet for gas to flow after traveling upward (positive z-direction) through an associated section of gas permeable membrane 406.

The gas traversing through the gas extraction openings may be permitted to vent naturally or be extractable through the openings via a pump or compressor. In one implementation, the extracted gas is directed to a flare stack or into another containment vessel.

In at least one implementation, the sections of the gas permeable membrane 406 are interlinked in a manner that prevents substantial movement of the sections relative to one another. The sections may also be interlinked in a manner that prevents the gas impermeable cover layer 104 from pinching off gas transmission routes through the gas permeable membrane 406 from the interior of the vessel 402 to an exterior of the vessel 402.

Figure 5:
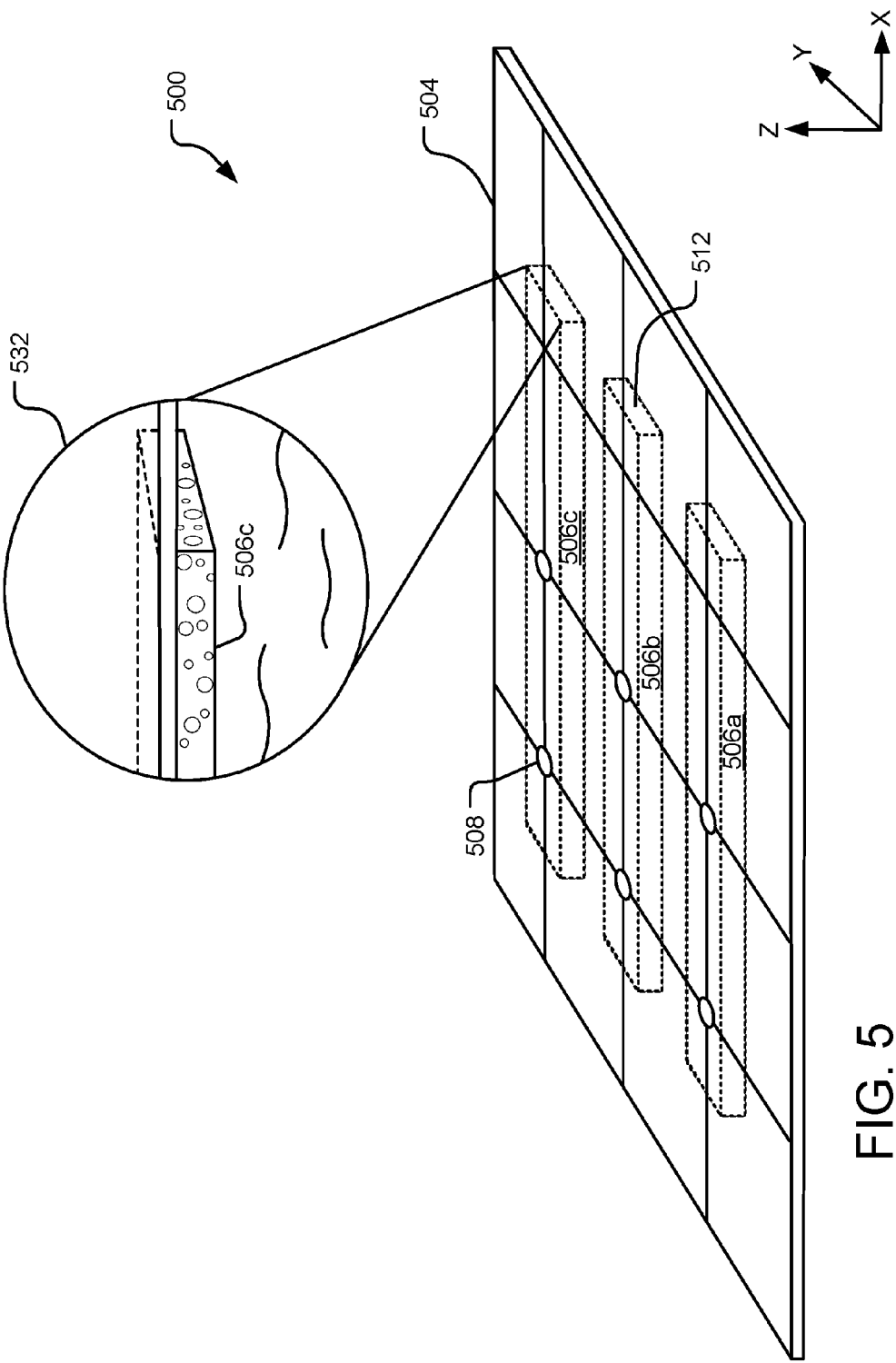
FIG. 5 illustrates a cross-sectional view of another example gas scavenging system including a gas impermeable cover layer and an underlying gas permeable membrane.

FIG. 5 illustrates a cross-sectional view of another example gas scavenging system 500 including a gas impermeable cover layer 504 and an underlying gas permeable membrane 506. The gas permeable membrane 506 is a buoyant structure including a plurality of separate elongated rectangular sections (e.g., sections 506a, 506b, 506c) that each includes a number of exposed pores (as visible in exploded side perspective view 532). The exposed pores are in fluid communication with plurality of internal channels. The pores and internal channels of the gas permeable membrane 506 provide for transport of a gas in one or more directions through the gas permeable membrane 506.

The gas impermeable cover layer 504 overlies the sections of gas permeable membrane 506, and functions to reflect gas at downward (e.g., negative z-direction) angles toward an internal volume of a holding tank, facilitating radial transport (e.g., in the X-Y plane) of gas through each of the sections of the gas permeable membrane 506. Each of the separate sections of the gas permeable membrane 506 includes outer pores and internal channels in fluid communication with at least one extraction opening (e.g., an example extraction opening 508). For example, a side surface 512 of each section may be adjacent to a gas intake line that vents or actively extracts gas from below the gas impermeable cover layer 504.

In one example implementation, the sections (e.g., a section 506a) of the buoyant gas permeable membrane 506 are multiple feet wide (e.g., about four feet) and spaced apart from one another by a relatively small distance (e.g., about 1 inch). The length of each section is, in one implementation, approximately equal to the length of the overlying cover layer 504.

Figure 6:
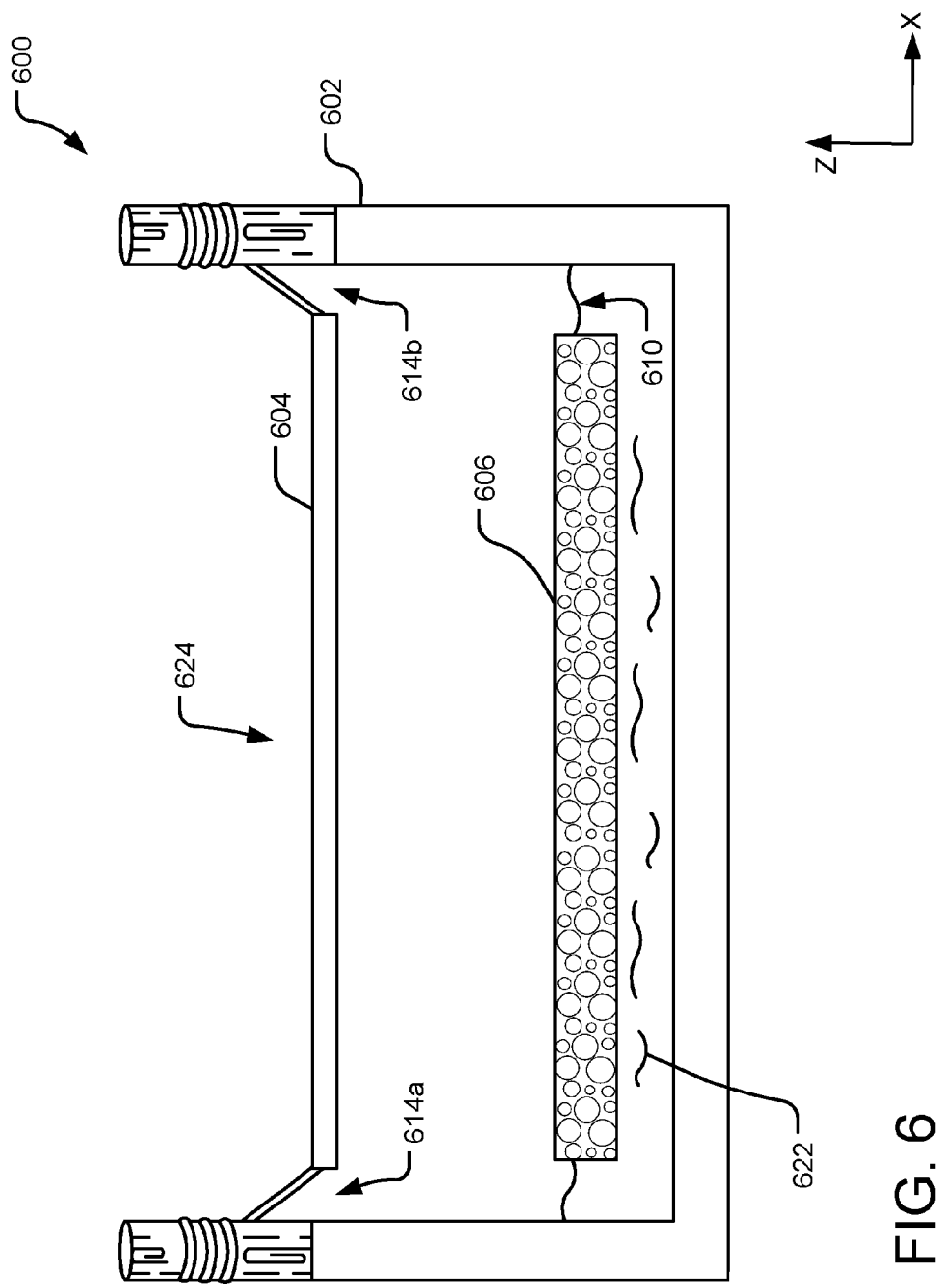
FIG. 6 illustrates a cross-sectional view of another example gas scavenging system with a cover including a gas impermeable cover layer and a gas permeable membrane.

FIG. 6 illustrates a cross-sectional view of another example gas scavenging system 600 with a cover 624 including a gas impermeable cover layer 604 and a gas permeable membrane 606. The gas permeable membrane 606 is made of a buoyant material that floats atop a fluid volume 622 stored within a holding tank 602, and is permitted to rise and fall along with the surface level 610 of the fluid volume 622. The gas permeable membrane 606 includes a number of exposed pores in fluid communication with a plurality of internal channels that provide for transport of a gas in one or more directions through the gas permeable membrane 606.

The gas permeable membrane 606 is a free floating structure within holding tank 602. The gas impermeable cover layer 604 is suspended above the holding tank 602 and not attached to the gas permeable membrane 606. In operation, gasses within the holding tank 602 vent through the gas permeable membrane 606 and are released or captured into an external containment structure (not shown) through one or more gas extraction openings (e.g., openings 614a and 614b).

As the gas permeable membrane 606 rises and falls (e.g., by a distance of a few feet), the gas impermeable cover layer 604 remains fixed and suspended across the holding tank 602 (as illustrated), spanning a diameter of the holding tank 602 and covering the gas permeable membrane 606. Other features of the gas scavenging system 600 may be the same or similar to those discussed above with respect to other implementations herein.

Figure 7:
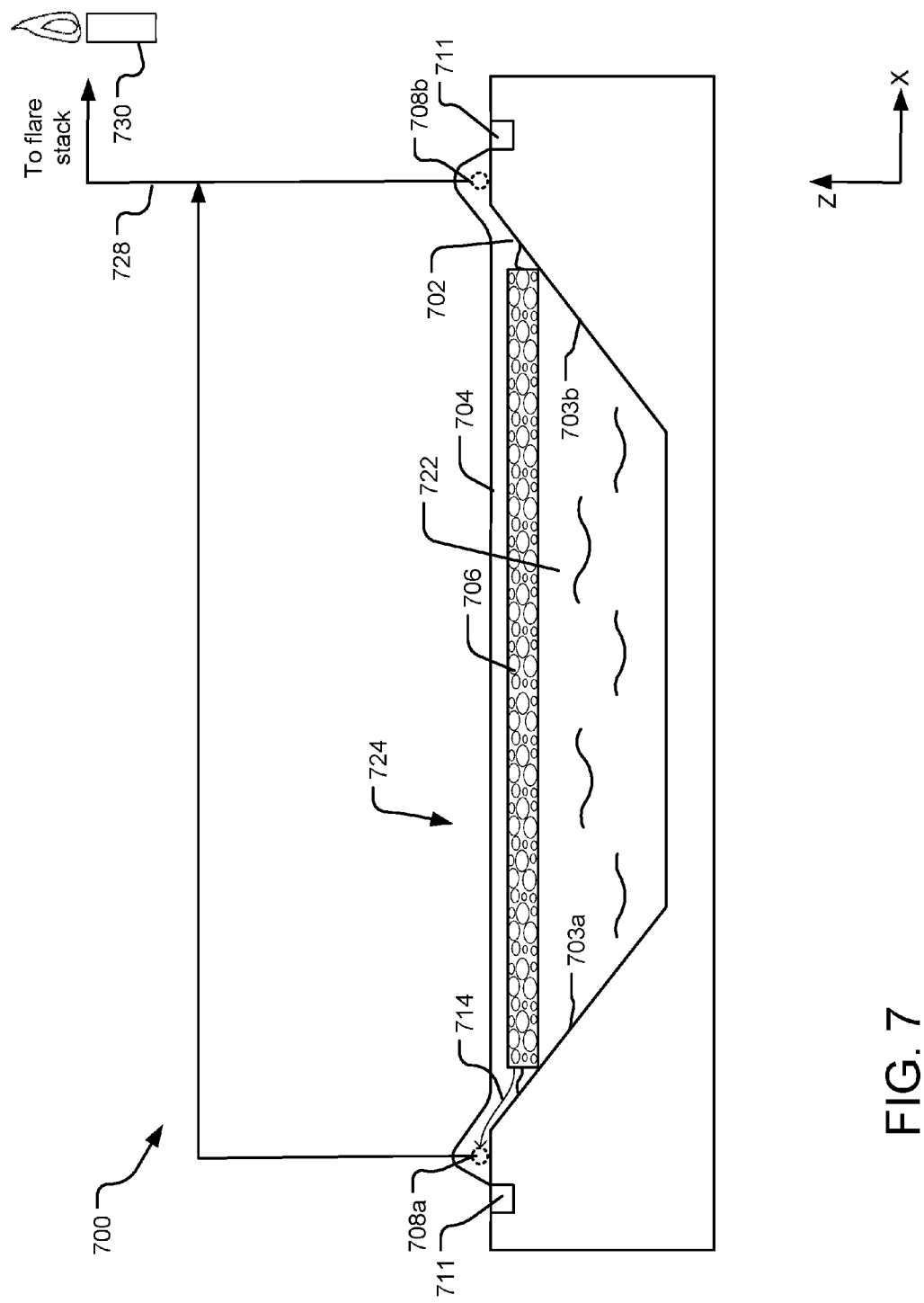
FIG. 7 illustrates a cross-sectional view of another example gas scavenging system with a cover including a gas impermeable cover layer and a gas permeable membrane.

FIG. 7 illustrates a cross-sectional view of another example gas scavenging system 700 with a cover 724 including a gas impermeable cover layer 704 and a gas permeable membrane 706. The cover 724 is positioned within an earthen reservoir 702 (e.g., an example holding tank) having sloped sidewalls 703a and 703b and containing a fluid volume 722. The gas permeable membrane 706 is made of a buoyant material that floats atop and provides insulation to the fluid volume 722. In addition, the gas permeable membrane 706 includes a number of exposed pores in fluid communication with a plurality of internal channels that provide for transport of a gas in one or more directions.

The gas impermeable cover layer 704 overlies the gas permeable membrane 706 and is secured to opposite sides of the earthen reservoir 702 within a perimeter anchor trench 711. One or more perforations (e.g., perforations 708a and 708b) are formed in the gas impermeable cover layer 704, allowing for gas from within the earthen reservoir 702 to escape to an external environment (e.g., as shown by arrow 714 exemplifying one path that gas may take out of the earthen reservoir 702). After escaping the earthen reservoir 702 via the perforations 708a, 708b, gas is directed (e.g., along a conduit 728) to a flare stack 730. In one implementation, the perforations 708a and 708b are sections of a perimeter perforated pipe that feed into a solid-walled (e.g., non perforated) pipe. The solid-walled pipe penetrates the gas impermeable cover layer 704 through one or more sealed openings (not shown) before connecting to the conduit 728 and feeding into the flare stack 730.

Figure 8:
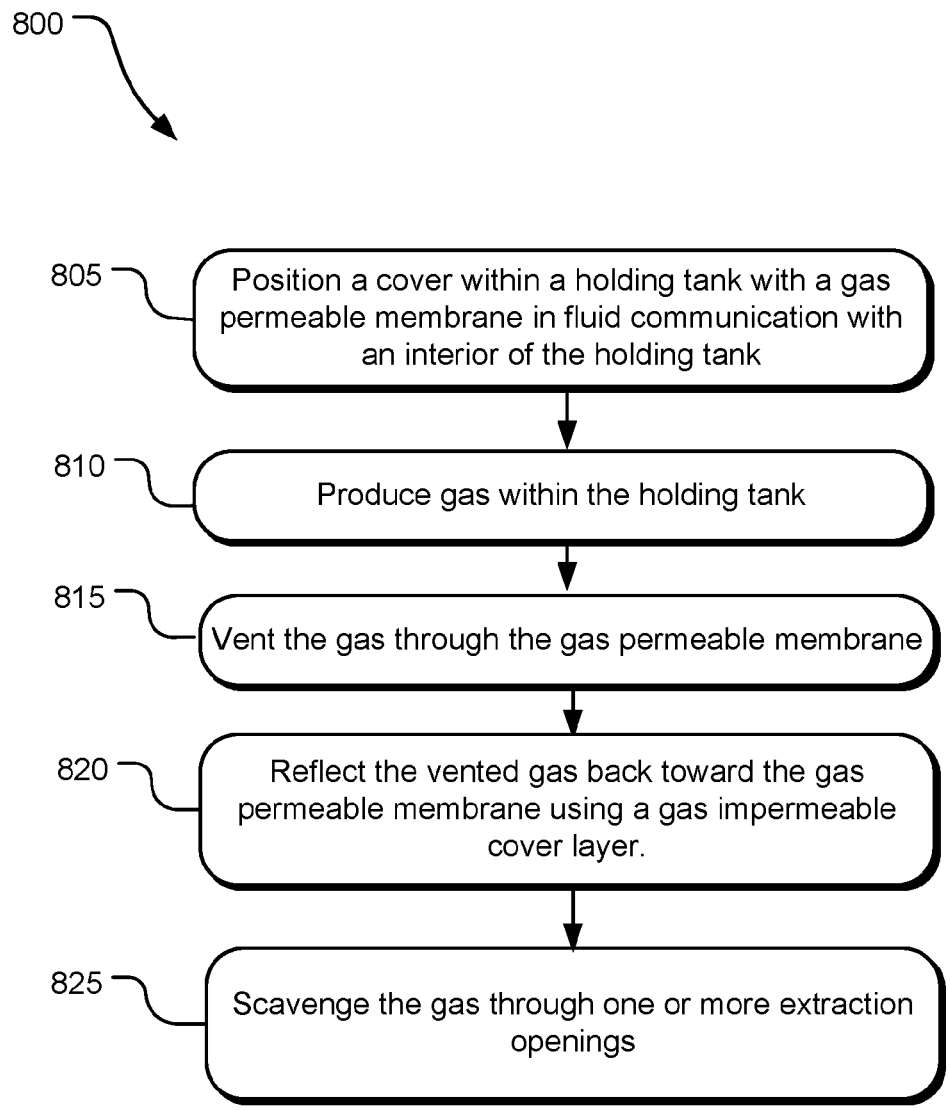
FIG. 8 illustrates example implementations for scavenging gas from a holding tank.

FIG. 8 illustrates example implementations 800 for scavenging gas from a holding tank. A positioning operation 805 positions a cover within a holding tank. The cover includes at least a gas permeable membrane and a gas impermeable cover layer. The positioning operation 805 positions the gas permeable membrane in fluid communication with an interior of the holding tank so that gas within the holding tank may enter the gas permeable membrane. In one implementation, the gas permeable membrane is an open-cell foam with a plurality of exposed pores on an outer surface. The exposed pores are fluid communication with a matrix of pores on the interior of the gas permeable membrane. Collectively, the exposed pores and internal pores form directed channels that facilitate transport through the gas permeable membrane in one or more directions.

A production operation 810 produces gas within the holding tank. For example, chemical and/or biological reactions occurring within the holding tank may generate gas within the holding tank. A venting operation 815 vents gas through the gas permeable membrane, and reflecting operation 820 reflects the vented gas back toward an interior of the holding tank at a variety of downward angles. The gas is permitted to move in a generally lateral direction along a length of the cover within the gas permeable membrane and/or a within a gap between the gas permeable membrane and the gas impermeable cover layer.

A scavenging operation 825 extracts the gas through one or more extraction openings. A gas extraction opening may be, for example, an opening in a sidewall of the holding tank; an opening between a sidewall of the holding tank and the gas impermeable cover layer; or a cutout or aperture formed within the gas impermeable cover layer. The gas may be vented naturally or extracted via a pump or compressor. In one implementation, the extracted gas is directed to a flare stack or into another containment vessel. In some implementations, scavenging is enhanced by forming the gas permeable membrane in different sections separated from one another by channels that improve gas transmission efficiency.

The above specification and examples provide a complete description of the structure and use of exemplary implementations of the invention. Since many implementations of the invention can be made without departing form the spirit and scope of the invention, the invention resides in the claims hereinafter appended. Furthermore, structural features of the different embodiments may be combined in yet another embodiment without departing from the recited claims.

What is claimed is:

1. A system comprising:
    a gas permeable membrane configured to receive gas from a holding tank;
    a flexible gas impermeable layer positioned adjacent to the gas permeable membrane and sized to overlay and substantially conceal the gas permeable membrane within the holding tank, wherein the flexible gas impermeable layer includes at least one gas extraction opening; and
    an extraction mechanism that controllably scavenges the gas out through the at least one gas extraction opening and out of the holding tank.

2. The system of claim 1, wherein the extraction mechanism is at least one of a scavenger or blower.

3. The system of claim 1, further comprising:
a channel coupled to the at least one extraction opening, wherein the scavenged gas is directed through the channel to at least one of a flare stack or a containment vessel external to the holding tank.

4. The system of claim 1, wherein the gas from the holding tank flows through the gas permeable layer to reach the gas extraction opening.

5. The system of claim 1, wherein the flexible gas impermeable layer is continuous across a first length and the gas permeable membrane is discontinuous across a corresponding length.

6. The system of claim 1, wherein the at least one gas extraction opening in the flexible gas impermeable layer further includes a plurality of extraction openings.

7. The system of claim 6, wherein the plurality of extraction openings are distributed about a perimeter region of the flexible gas impermeable layer.

8. The system of claim 1, wherein the gas permeable membrane includes multiple discrete sections each axially aligned with an extraction opening of the flexible gas impermeable layer.

9. The system of claim 1, wherein the gas permeable membrane receives the gas through a first surface and the flexible gas impermeable layer facilitates transmission of the gas in a direction substantially parallel to the first surface.

10. The system claim 1, wherein the gas permeable membrane is attached to the flexible gas impermeable layer and adapted to float atop of a liquid volume stored within the holding tank.

11. The system of claim 1, wherein the gas permeable membrane includes a number of separate interlinked sections.

12. A method comprising:
positioning a cover within a holding tank, the cover including a flexible gas impermeable layer and a gas permeable membrane between the flexible gas impermeable layer and an interior of the holding tank, the flexible gas impermeable layer sized to overlay and substantially conceal the gas permeable membrane and further including at least one extraction opening, wherein the flexible gas impermeable layer is continuous across a first length and the gas permeable membrane is discontinuous across a corresponding length;
controllably scavenging gas from the interior of the holding tank through the at least one extraction opening.

13. The method of claim 12, wherein controllably scavenging the gas further comprises flowing gas from the holding tank through the gas permeable membrane and through the gas extraction opening.

14. The method of claim 12, wherein controllably scavenging the gas further comprises controllably scavenging the gas with a scavenger or blower.

15. The method of claim 12, wherein the at least one gas extraction opening in the flexible gas impermeable layer further includes a plurality of extraction openings.

16. The method of claim 15, wherein the plurality of extraction openings are distributed about a perimeter region of the flexible gas impermeable layer.

17. The method of claim 15, wherein the flexible gas impermeable layer includes multiple discrete sections each axially aligned with one of the extraction openings.

18. The method of claim 12 wherein the positioning operation further comprises:
positioning the first surface of the gas permeable membrane in contact with a fluid stored within the holding tank; and
reflecting gas produced within the holding tank back toward the interior of the holding tank via the flexible gas impermeable layer.

19. The method of claim 12, further comprising:
directing the scavenged gas through a channel and to at least one of a flare stack or a containment vessel external to the holding tank.

* * * * *